US008351350B2

(12) United States Patent
Bhandari et al.

(10) Patent No.: US 8,351,350 B2
(45) Date of Patent: Jan. 8, 2013

(54) SYSTEMS AND METHODS FOR CONFIGURING ACCESS CONTROL DEVICES

(75) Inventors: Neelendra Bhandari, Barmer (IN); Priteshkumar D Joshi, Dhoraji (IN); Chandrakanth C Reddy, Kurnool (IN); Parveen Kumar Goel, New South Wales (AU)

(73) Assignee: Honeywell International Inc., Morristown, NJ (US)

( * ) Notice: Subject to any disclaimer, the term of this patent is extended or adjusted under 35 U.S.C. 154(b) by 185 days.

(21) Appl. No.: 12/601,588

(22) PCT Filed: May 21, 2008
(Under 37 CFR 1.47)

(86) PCT No.: PCT/AU2008/000716
§ 371 (c)(1),
(2), (4) Date: May 19, 2010

(87) PCT Pub. No.: WO2008/144803
PCT Pub. Date: Dec. 4, 2008

(65) Prior Publication Data
US 2011/0038278 A1 Feb. 17, 2011

(30) Foreign Application Priority Data
May 28, 2007 (AU) ................................ 2007902846

(51) Int. Cl.
*H04L 12/28* (2006.01)
(52) U.S. Cl. ........ 370/254; 370/255; 370/351; 370/352; 70/264; 70/279.1; 726/5; 726/4

(58) Field of Classification Search .................. 370/254, 370/351, 352; 235/380, 492; 70/264, 279.1; 726/5, 4
See application file for complete search history.

(56) References Cited

U.S. PATENT DOCUMENTS

| | | | |
|---|---|---|---|
| 3,753,232 A | 8/1973 | Sporer | |
| 3,806,911 A | 4/1974 | Pripusich | |
| 3,857,018 A | 12/1974 | Stark et al. | |
| 3,860,911 A | 1/1975 | Hinman et al. | |
| 3,866,173 A | 2/1975 | Moorman et al. | |

(Continued)

FOREIGN PATENT DOCUMENTS
CA 2240881 12/1999
(Continued)

OTHER PUBLICATIONS
"Certificate Validation Choices," CoreStreet, Inc., 8 pages, 2002.
(Continued)

*Primary Examiner* — Robert Wilson
*Assistant Examiner* — Mohamed Kamara
(74) *Attorney, Agent, or Firm* — Seager Tufte & Wickhem LLC.

(57) ABSTRACT

Described herein are systems and methods for configuring access control devices. In overview, some embodiments provide for a method whereby a smartcard is used to configure a disconnected access control device. A user presents this smartcard to a connected access control device which, in response to the presentation of this card, allows the user to download to the smartcard one or more aspects of configuration data for a specified disconnected access control device. The user subsequently presents the smartcard to the relevant disconnected access control device, which uploads and selectively applies the one or more aspects of configuration data.

17 Claims, 8 Drawing Sheets

U.S. PATENT DOCUMENTS

| | | | |
|---|---|---|---|
| 3,906,447 | A | 9/1975 | Crafton |
| 4,095,739 | A | 6/1978 | Fox et al. |
| 4,146,085 | A | 3/1979 | Wills |
| 4,148,012 | A | 4/1979 | Baump et al. |
| 4,161,778 | A | 7/1979 | Getson, Jr. et al. |
| 4,213,118 | A | 7/1980 | Genest et al. |
| 4,283,710 | A | 8/1981 | Genest et al. |
| 4,298,946 | A | 11/1981 | Hartsell et al. |
| 4,332,852 | A | 6/1982 | Korklan et al. |
| 4,336,902 | A | 6/1982 | Neal |
| 4,337,893 | A | 7/1982 | Flanders et al. |
| 4,353,064 | A | 10/1982 | Stamm |
| 4,373,664 | A | 2/1983 | Barker et al. |
| 4,379,483 | A | 4/1983 | Farley |
| 4,462,028 | A | 7/1984 | Ryan et al. |
| 4,525,777 | A | 6/1985 | Webster et al. |
| 4,538,056 | A | 8/1985 | Young et al. |
| 4,556,169 | A | 12/1985 | Zervos |
| 4,628,201 | A | 12/1986 | Schmitt |
| 4,646,964 | A | 3/1987 | Parker et al. |
| 4,685,615 | A | 8/1987 | Hart |
| 4,821,177 | A | 4/1989 | Koegel et al. |
| 4,847,839 | A | 7/1989 | Hudson, Jr. et al. |
| 5,070,468 | A | 12/1991 | Niinomi et al. |
| 5,071,065 | A | 12/1991 | Aalto et al. |
| 5,099,420 | A | 3/1992 | Barlow et al. |
| 5,172,565 | A | 12/1992 | Wruck et al. |
| 5,204,663 | A | 4/1993 | Lee |
| 5,227,122 | A | 7/1993 | Scarola et al. |
| 5,259,553 | A | 11/1993 | Shyu |
| 5,271,453 | A | 12/1993 | Yoshida et al. |
| 5,361,982 | A | 11/1994 | Liebl et al. |
| 5,404,934 | A | 4/1995 | Carlson et al. |
| 5,420,927 | A | 5/1995 | Micali |
| 5,449,112 | A | 9/1995 | Heitman et al. |
| 5,465,082 | A | 11/1995 | Chaco |
| 5,479,154 | A | 12/1995 | Wolfram |
| 5,481,481 | A | 1/1996 | Frey et al. |
| 5,526,871 | A | 6/1996 | Musser et al. |
| 5,541,585 | A | 7/1996 | Duhame et al. |
| 5,591,950 | A | 1/1997 | Imedio-Ocana |
| 5,604,804 | A | 2/1997 | Micali |
| 5,610,982 | A | 3/1997 | Micali |
| 5,631,825 | A | 5/1997 | van Weele et al. |
| 5,640,151 | A | 6/1997 | Reis et al. |
| 5,644,302 | A | 7/1997 | Hana et al. |
| 5,663,957 | A | 9/1997 | Dent |
| 5,666,416 | A | 9/1997 | Micali |
| 5,717,757 | A | 2/1998 | Micali |
| 5,717,758 | A | 2/1998 | Micall |
| 5,717,759 | A | 2/1998 | Micali |
| 5,732,691 | A | 3/1998 | Maiello et al. |
| 5,774,058 | A * | 6/1998 | Henry et al. .................. 340/5.5 |
| 5,778,256 | A | 7/1998 | Darbee |
| 5,793,868 | A | 8/1998 | Micali |
| 5,914,875 | A | 6/1999 | Monta et al. |
| 5,915,473 | A | 6/1999 | Ganesh et al. |
| 5,927,398 | A | 7/1999 | Maciulewicz |
| 5,930,773 | A | 7/1999 | Crooks et al. |
| 5,960,083 | A | 9/1999 | Micali |
| 5,973,613 | A | 10/1999 | Reis et al. |
| 5,992,194 | A * | 11/1999 | Baukholt et al. ............. 70/279.1 |
| 6,072,402 | A | 6/2000 | Kniffin et al. |
| 6,097,811 | A | 8/2000 | Micali |
| 6,104,963 | A | 8/2000 | Cebasek et al. |
| 6,119,125 | A | 9/2000 | Gloudeman et al. |
| 6,141,595 | A | 10/2000 | Gloudeman et al. |
| 6,149,065 | A | 11/2000 | White et al. |
| 6,154,681 | A | 11/2000 | Drees et al. |
| 6,167,316 | A | 12/2000 | Gloudeman et al. |
| 6,233,954 | B1 | 5/2001 | Mehaffey et al. |
| 6,241,156 | B1 | 6/2001 | Kline et al. |
| 6,249,755 | B1 | 6/2001 | Yemini et al. |
| 6,260,765 | B1 | 7/2001 | Natale et al. |
| 6,292,893 | B1 | 9/2001 | Micali |
| 6,301,659 | B1 | 10/2001 | Micali |
| 6,318,137 | B1 | 11/2001 | Chaum |
| 6,324,854 | B1 | 12/2001 | Jayanth |
| 6,334,121 | B1 | 12/2001 | Primeaux et al. |
| 6,347,374 | B1 | 2/2002 | Drake et al. |
| 6,366,558 | B1 | 4/2002 | Howes et al. |
| 6,369,719 | B1 | 4/2002 | Tracy et al. |
| 6,374,356 | B1 | 4/2002 | Daigneault et al. |
| 6,393,848 | B2 | 5/2002 | Roh et al. |
| 6,394,359 | B1 | 5/2002 | Morgan |
| 6,424,068 | B2 | 7/2002 | Nakagishi |
| 6,453,426 | B1 | 9/2002 | Gamache et al. |
| 6,453,687 | B2 | 9/2002 | Sharood et al. |
| 6,483,697 | B1 | 11/2002 | Jenks et al. |
| 6,487,658 | B1 | 11/2002 | Micali |
| 6,490,610 | B1 | 12/2002 | Rizvi et al. |
| 6,496,575 | B1 | 12/2002 | Vasell et al. |
| 6,516,357 | B1 * | 2/2003 | Hamann et al. ................... 710/2 |
| 6,518,953 | B1 | 2/2003 | Armstrong |
| 6,546,419 | B1 | 4/2003 | Humpleman et al. |
| 6,556,899 | B1 | 4/2003 | Harvey et al. |
| 6,574,537 | B2 | 6/2003 | Kipersztok et al. |
| 6,604,023 | B1 | 8/2003 | Brown et al. |
| 6,615,594 | B2 | 9/2003 | Jayanth et al. |
| 6,628,997 | B1 | 9/2003 | Fox et al. |
| 6,647,317 | B2 | 11/2003 | Takai et al. |
| 6,647,400 | B1 | 11/2003 | Moran |
| 6,658,373 | B2 | 12/2003 | Rossi et al. |
| 6,663,010 | B2 | 12/2003 | Chene et al. |
| 6,665,669 | B2 | 12/2003 | Han et al. |
| 6,667,690 | B2 | 12/2003 | Durej et al. |
| 6,741,915 | B2 | 5/2004 | Poth |
| 6,758,051 | B2 | 7/2004 | Jayanth et al. |
| 6,766,450 | B2 | 7/2004 | Micali |
| 6,789,739 | B2 | 9/2004 | Rosen |
| 6,796,494 | B1 * | 9/2004 | Gonzalo ......................... 235/380 |
| 6,801,849 | B2 | 10/2004 | Szukala et al. |
| 6,801,907 | B1 | 10/2004 | Zagami |
| 6,826,454 | B2 | 11/2004 | Sulfstede |
| 6,851,621 | B1 | 2/2005 | Wacker et al. |
| 6,871,193 | B1 | 3/2005 | Campbell et al. |
| 6,886,742 | B2 | 5/2005 | Stoutenburg et al. |
| 6,895,215 | B2 | 5/2005 | Uhlmann |
| 6,910,135 | B1 | 6/2005 | Grainger |
| 6,967,612 | B1 | 11/2005 | Gorman et al. |
| 6,969,542 | B2 | 11/2005 | Klasen-Memmer et al. |
| 6,970,070 | B2 | 11/2005 | Juels et al. |
| 6,973,410 | B2 | 12/2005 | Seigel |
| 6,983,889 | B2 | 1/2006 | Alles |
| 6,989,742 | B2 | 1/2006 | Ueno et al. |
| 7,004,401 | B2 | 2/2006 | Kallestad |
| 7,019,614 | B2 | 3/2006 | Lavelle et al. |
| 7,032,114 | B1 | 4/2006 | Moran |
| 7,055,759 | B2 | 6/2006 | Wacker et al. |
| 7,130,719 | B2 | 10/2006 | Ehlers et al. |
| 7,183,894 | B2 | 2/2007 | Yui et al. |
| 7,203,962 | B1 | 4/2007 | Moran |
| 7,205,882 | B2 | 4/2007 | Libin |
| 7,216,007 | B2 | 5/2007 | Johnson |
| 7,216,015 | B2 | 5/2007 | Poth |
| 7,218,243 | B2 | 5/2007 | Hayes et al. |
| 7,222,800 | B2 | 5/2007 | Wruck |
| 7,233,243 | B2 | 6/2007 | Roche et al. |
| 7,243,001 | B2 | 7/2007 | Janert et al. |
| 7,245,223 | B2 | 7/2007 | Trela |
| 7,250,853 | B2 | 7/2007 | Flynn |
| 7,274,676 | B2 | 9/2007 | Cardei et al. |
| 7,313,819 | B2 | 12/2007 | Burnett et al. |
| 7,321,784 | B2 * | 1/2008 | Serceki et al. ................ 455/557 |
| 7,337,315 | B2 | 2/2008 | Micali |
| 7,343,265 | B2 | 3/2008 | Andarawis et al. |
| 7,353,396 | B2 | 4/2008 | Micali et al. |
| 7,362,210 | B2 | 4/2008 | Bazakos et al. |
| 7,379,997 | B2 | 5/2008 | Ehlers et al. |
| 7,380,125 | B2 | 5/2008 | Di Luoffo et al. |
| 7,383,158 | B2 | 6/2008 | Krocker et al. |
| 7,397,371 | B2 | 7/2008 | Martin et al. |
| 7,408,925 | B1 * | 8/2008 | Boyle et al. ................... 370/352 |
| 7,505,914 | B2 | 3/2009 | McCall |
| 7,542,867 | B2 | 6/2009 | Steger et al. |
| 7,574,734 | B2 | 8/2009 | Fedronic et al. |
| 7,586,398 | B2 | 9/2009 | Huang et al. |

| | | | |
|---|---|---|---|
| 7,600,679 B2 | 10/2009 | Kshirsagar et al. | |
| 7,661,603 B2 | 2/2010 | Yoon et al. | |
| 7,735,145 B2 * | 6/2010 | Kuehnel et al. | 726/36 |
| 7,797,459 B1 | 9/2010 | Roy et al. | |
| 7,818,026 B2 * | 10/2010 | Hartikainen et al. | 455/550.1 |
| 7,853,987 B2 | 12/2010 | Balasubramanian et al. | |
| 7,861,314 B2 * | 12/2010 | Serani et al. | 726/27 |
| 7,907,753 B2 | 3/2011 | Wilson et al. | |
| 7,937,669 B2 | 5/2011 | Zhang et al. | |
| 7,983,892 B2 | 7/2011 | Anne et al. | |
| 7,995,526 B2 | 8/2011 | Liu et al. | |
| 8,045,960 B2 | 10/2011 | Orakkan | |
| 8,095,889 B2 | 1/2012 | DeBlaey et al. | |
| 2002/0011923 A1 | 1/2002 | Cunningham et al. | |
| 2002/0022991 A1 | 2/2002 | Sharood et al. | |
| 2002/0046337 A1 | 4/2002 | Micali | |
| 2002/0118096 A1 | 8/2002 | Hoyos et al. | |
| 2002/0121961 A1 | 9/2002 | Huff | |
| 2002/0163999 A1 * | 11/2002 | Farris et al. | 379/88.02 |
| 2002/0165824 A1 | 11/2002 | Micali | |
| 2003/0028814 A1 | 2/2003 | Carta et al. | |
| 2003/0033230 A1 | 2/2003 | McCall | |
| 2003/0174049 A1 | 9/2003 | Beigel et al. | |
| 2003/0208689 A1 | 11/2003 | Garza | |
| 2003/0233432 A1 | 12/2003 | Davis et al. | |
| 2004/0062421 A1 | 4/2004 | Jakubowski et al. | |
| 2004/0064453 A1 | 4/2004 | Ruiz et al. | |
| 2004/0087362 A1 | 5/2004 | Beavers | |
| 2004/0190489 A1 * | 9/2004 | Palaez et al. | 370/351 |
| 2004/0205350 A1 | 10/2004 | Waterhouse et al. | |
| 2005/0138380 A1 | 6/2005 | Fedronic et al. | |
| 2006/0059557 A1 | 3/2006 | Markham et al. | |
| 2006/0065730 A1 | 3/2006 | Quan et al. | |
| 2007/0109098 A1 | 5/2007 | Siemon et al. | |
| 2007/0132550 A1 | 6/2007 | Avraham et al. | |
| 2007/0171862 A1 | 7/2007 | Tang et al. | |
| 2007/0268145 A1 | 11/2007 | Bazakos et al. | |
| 2007/0272744 A1 | 11/2007 | Bantwal et al. | |
| 2008/0086758 A1 | 4/2008 | Chowdhury et al. | |
| 2008/0173709 A1 | 7/2008 | Ghosh | |
| 2008/0272881 A1 | 11/2008 | Goel | |
| 2009/0018900 A1 | 1/2009 | Waldron et al. | |
| 2009/0080443 A1 | 3/2009 | Dziadosz | |
| 2009/0086692 A1 | 4/2009 | Chen | |
| 2009/0121830 A1 | 5/2009 | Dziadosz | |
| 2009/0167485 A1 | 7/2009 | Birchbauer et al. | |
| 2009/0168695 A1 | 7/2009 | Johar et al. | |
| 2009/0258643 A1 | 10/2009 | McGuffin | |
| 2009/0266885 A1 | 10/2009 | Marcinowski et al. | |
| 2009/0292524 A1 | 11/2009 | Anne et al. | |
| 2009/0292995 A1 | 11/2009 | Anne et al. | |
| 2009/0292996 A1 | 11/2009 | Anne et al. | |
| 2009/0328152 A1 | 12/2009 | Thomas et al. | |
| 2009/0328203 A1 | 12/2009 | Haas | |
| 2010/0036511 A1 | 2/2010 | Dongare | |
| 2010/0148918 A1 | 6/2010 | Gerner et al. | |
| 2010/0164720 A1 | 7/2010 | Kore | |
| 2010/0220715 A1 * | 9/2010 | Cherchali et al. | 370/352 |
| 2010/0269173 A1 | 10/2010 | Srinivasa et al. | |
| 2011/0038278 A1 | 2/2011 | Bhandari et al. | |
| 2011/0071929 A1 | 3/2011 | Morrison | |
| 2011/0115602 A1 | 5/2011 | Bhandari et al. | |
| 2011/0133884 A1 | 6/2011 | Kumar et al. | |
| 2011/0153791 A1 | 6/2011 | Jones et al. | |
| 2011/0167488 A1 | 7/2011 | Roy et al. | |
| 2011/0181414 A1 | 7/2011 | G. et al. | |
| 2012/0096131 A1 | 4/2012 | Bhandari et al. | |
| 2012/0106915 A1 | 5/2012 | Palmer | |
| 2012/0121229 A1 | 5/2012 | Lee | |
| 2012/0133482 A1 | 5/2012 | Bhandari et al. | |

FOREIGN PATENT DOCUMENTS

| | | |
|---|---|---|
| CN | 1265762 A | 9/2000 |
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | 9627858 | 9/1996 |
| WO | 9627858 A1 | 9/1996 |
| WO | WO 00/11592 | 3/2000 |
| WO | 0076220 A1 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |
| WO | 02091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | 2006126974 A1 | 11/2006 |
| WO | 2007043798 A1 | 4/2007 |
| WO | WO 2008/045918 | 4/2008 |
| WO | WO 2008/144803 | 12/2008 |
| WO | WO 2010/039598 | 4/2010 |
| WO | WO 2010/106474 | 9/2010 |

OTHER PUBLICATIONS

"CoreStreet Cuts the PKI Gordian Knot," Digital ID World, pp. 22-25, Jun./Jul. 2004.
"Distributed Certificate Validation," CoreStreet, Ltd., 17 pages, 2006.
"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Manageable Secure Physical Access," Corestreet Ltd, 3 pages, 2002.
"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Securit," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
U.S. Appl. No. 13/292,992, filed Nov. 9, 2011.
Goldman et al., "Information Modeling for Intrusion Report Aggregation," IEEE, Proceedings DARPA Information Survivability Conference and Exposition II, pp. 329-342, 2001.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.

http://www.tcsbasys.com/products/sz1020series.asp, TCS/Basys Controls: Where Buildings Connect With Business, 2 pages, printed Aug. 26, 2003.

http://www.tcsbasys.com/products/sz1022.asp, TCS/Basys Controls: Where Buildings Connect With Business, 2 pages, printed Aug. 26, 2003.

http://www.tcsbasys.com/products/sz1024.asp, TCS/Basys Controls: Where Builsings Connect With Business, 2 pages, printed Aug. 26, 2003.

http://www.tcsbasys.com/products/sz1030series.asp, TCS/Basys Controls: Where Buildings Connect With Business, 2 pages, printed Aug. 26, 2003.

http://www.tcsbasys.com/products/sz1033.asp, TCS/Basys Controls: Where Buildings Connect With Business, 2 pages, printed Aug. 26, 2003.

http://www.tcsbasys.com/products/sz1035.asp, TCS/Basys Controls: Where Buildings Connect With Business, 2 pages, printed Aug. 26, 2003.

http://www.tcsbasys.com/products/sz1041.asp, TCS/Basys Controls: Where Buildings Connect With Business, 1 page, printed Aug. 26, 2003.

http://www.tcsbasys.com/products/sz1050series.asp, TCS/Basys Controls: Where Buildings Connect With Business, 2 pages, printed Aug. 26, 2003.

http://www.tcsbasys.com/products/sz1051.asp, TCS/Basys Controls: Where Buildings Connect With Business, 2 pages, printed Aug. 26, 2003.

http://www.tcsbasys.com/products/sz1053.asp, TCS/Basys Controls: Where Buildings Connect With Business, 2 pages, printed Aug. 26, 2003.

http://wwww.tcsbasys.com/products/sz1031.asp, TCS/Basys Controls: Where Buildings Connect With Business, 2 pages, printed Aug. 26, 2003.

Honeywell, "Excel Building Supervisor-Integrated R7044 and FS90 Ver. 2.0," Operator Manual, 70 pages, Apr. 1995.

Trane, "System Programming, Tracer Summit Version 14, BMTW-SVP01D-EN," 623 pages, 2002.

"Keyfast Technical Overview," Corestreet Ltd., 21 pages, 2004.

U.S. Appl. No. 13/533,334, filed Jun. 26, 2012.

* cited by examiner

SYSTEMS AND METHODS FOR CONFIGURING ACCESS CONTROL DEVICES

FIELD OF THE INVENTION

The present invention relates to access control, and more particularly to systems and methods for configuring access control devices. Embodiments of the invention have been particularly developed for configuring access control devices by way of smartcards, and the present disclosure is primarily focused accordingly. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

It is known to use a large number of access control devices in an access control environment. It is also known for such an environment to include:

Connected access control devices, which are connected to a network and communicate with a central administration server over that network.

Disconnected access control devices, which are not connected to the network. For example, in some cases an access control device, due to its location, cannot be provided with a network connection (either wired or wireless).

Typically, there is a need to periodically provide modified configuration data to access control devices. This is a relatively straightforward process in the case of a connected access control device—the modified configuration data is delivered by the administration server to the device over the network. However, providing modified configuration data to disconnected access control devices presents practical difficulties. One option is to transport the disconnected device to a location where it can receive the configuration data from a computational device, or where it can access an available network connection. However, in many instances, the device is not easily transportable. As such, a more appropriate technique is to transport a portable computational platform to the disconnected device.

Perhaps the most common approach for providing modified configuration data to a disconnected access control device involves physically connecting a computational platform (such as a laptop computer or PDA) to the disconnected access control device, and uploading the modified configuration data from the computational platform to the disconnected access control device. However, this requires a readily accessible connection interface (such as a serial port, USB port, or a parallel port), and typically further requires a reasonable degree of technical expertise to implement. Additionally, there remain significant limitations on the currency of configuration data able to be maintained on the disconnected reader at a given point in time.

It follows that there is a need in the art for improved systems and methods for configuring access control devices.

SUMMARY

It is an object of the present invention to overcome or ameliorate at least one of the disadvantages of the prior art, or to provide a useful alternative.

One aspect of the invention provides a method, performable by a connected access control device, for providing one or more aspects of configuration data for a disconnected access control device, the method including the steps of:

(a) receiving, whilst in a first mode of operation, data indicative of an instruction to adopt a second mode of operation;

(b) being responsive to the data received at (a) for adopting a second mode of operation;

(c) receiving data indicative of the disconnected access control device;

(d) obtaining first data indicative of the one or more aspects of configuration data for the disconnected access control device;

(e) writing to one or more carrier substrates collectively second data indicative of the one or more aspects of configuration data for the disconnected access control device, wherein the disconnected access control device is configured for reading the one or more carrier substrates and selectively applying the one or more aspects of configuration data (f) resuming the first mode of operation.

One embodiment provides a computer-readable carrier medium carrying a set of instructions that when executed by one or more processors cause the one or more processors to carry out a method, performable by a connected access control device, for providing one or more aspects of configuration data for a disconnected access control device, the method including the steps of:

(a) receiving, whilst in a first mode of operation, data indicative of an instruction to adopt a second mode of operation;

(b) being responsive to the data received at (a) for adopting a second mode of operation;

(c) receiving data indicative of the disconnected access control device;

(d) obtaining first data indicative of the one or more aspects of configuration data for the disconnected access control device;

(e) writing to one or more carrier substrates collectively second data indicative of the one or more aspects of configuration data for the disconnected access control device, wherein the disconnected access control device is configured for reading the one or more carrier substrates and selectively applying the one or more aspects of configuration data;

(f) resuming the first mode of operation.

Another aspect of the present invention provides a method, performable by a disconnected access control device, for selectively applying one or more aspects of configuration data, the method including the steps of:

(a) receiving, whilst in a first mode of operation, data indicative of an instruction to adopt a second mode of operation;

(b) being responsive to the data received at (a) for adopting a second mode of operation;

(c) reading from one or more carrier substrates collectively data indicative of the one or more aspects of configuration data;

(d) selectively applying the one or more aspects of configuration data;

(e) resuming the first mode of operation.

One embodiment provides a computer-readable carrier medium carrying a set of instructions that when executed by one or more processors cause the one or more processors to carry out a method, performable by a disconnected access control device, for selectively applying one or more aspects of configuration data, the method including the steps of:

(a) receiving, whilst in a first mode of operation, data indicative of an instruction to adopt a second mode of operation;

(b) being responsive to the data received at (a) for adopting a second mode of operation;

(c) reading from one or more carrier substrates collectively data indicative of the one or more aspects of configuration data;

(d) selectively applying the one or more aspects of configuration data;

(e) resuming the first mode of operation.

Another embodiment of the invention provides a method for providing one or more aspects of configuration data to a disconnected access control device, the method including the steps of:

(a) presenting a first predetermined access card to a connected access control device such that the connected access control device progresses from a first mode of operation to a second mode of operation;

(b) downloading the one or more aspects of configuration data to one or more carrier substrates collectively;

(c) presenting a second predetermined access card to the disconnected access control device such that the disconnected access control device progresses from a first mode of operation to a second mode of operation;

(d) uploading the one or more aspects of configuration data from the one or more carrier substrates collectively to the disconnected access control device such that the disconnected access control device selectively applies the one or more aspects of configuration data.

Another embodiment of the invention provides an access control device configured to perform a method for providing one or more aspects of configuration data for a disconnected access control device, the method including the steps of (a) receiving, whilst in a first mode of operation, data indicative of an instruction to adopt a second mode of operation;

(b) being responsive to the data received at (a) for adopting a second mode of operation;

(c) receiving data indicative of the disconnected access control device;

(d) obtaining first data indicative of the one or more aspects of configuration data for the disconnected access control device;

(e) writing to one or more carrier substrates collectively second data indicative of the one or more aspects of configuration data for the disconnected access control device, wherein the disconnected access control device is configured for reading the one or more carrier substrates and selectively applying the one or more aspects of configuration data (f) resuming the first mode of operation.

Another embodiment of the invention provides an access control device configured for performing a method for selectively applying one or more aspects of configuration data, the method including the steps of:

(a) receiving, whilst in a first mode of operation, data indicative of an instruction to adopt a second mode of operation;

(b) being responsive to the data received at (a) for adopting a second mode of operation;

(c) reading from one or more carrier substrates collectively data indicative of the one or more aspects of configuration data;

(d) selectively applying the one or more aspects of configuration data;

(e) resuming the first mode of operation.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for configuring access control devices. In overview, some embodiments provide for a method whereby a smartcard is used to configure a disconnected access control device. A user presents this smartcard to a connected access control device which, in response to the presentation of this smartcard, allows the user to download to the smartcard one or more aspects of configuration data for a specified disconnected access control device. The user subsequently presents the smartcard to the relevant disconnected access control device, which uploads and selectively applies the one or more aspects of configuration data.

In the context of the present disclosure, the term "system" is used to describe a hardware device. The term, as used in the context of a "system" for configuring access control devices, in some embodiments, describes an access control device. Methods for configuring access control devices are, in some embodiments, performable by software executable on a computing platform, this platform being, at least is in some cases, provided by an access control device.

Figure 1:
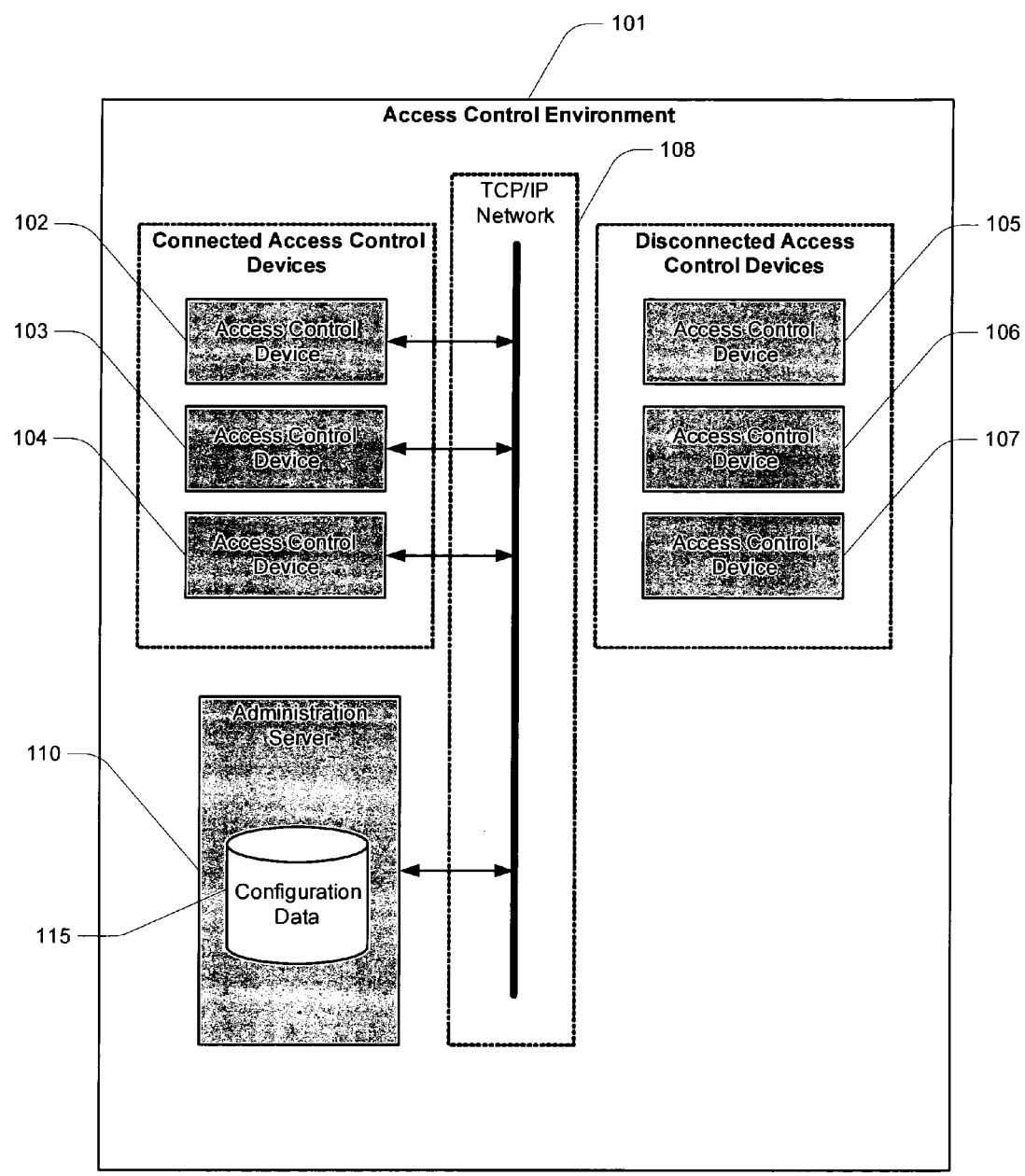
FIG. 1 schematically illustrates an access control environment according to one embodiment.

FIG. 1 schematically illustrates an access control environment 101 according to one embodiment. Environment 101 includes connected access control devices 102 to 104 and disconnected access control devices 105 to 107. The primary point of difference between the connected access control devices and the disconnected access control devices is that the former are connected to a network 108, (such as a TCP/IP or other network) whilst the latter are not. An administration server 110 is also connected to network 108, and the connected access control devices are able to communicate with this administration server over the network. Administration server 110 includes a database 115 for maintaining configuration data.

In the present embodiment, database 115 includes, for each access control device, up-to-date configuration data. This configuration data is "up-to-date" in the sense that it defines that data a particular device should ideally be applying at a give point in time, based on information available in the database. However, it will be appreciated that the configuration data applied at a given time by a particular disconnected access control device might not be up-to-date, and therefore should ideally be updated for compliance with database 115. For each access control device, the configuration data is made up of one or more aspects of configuration data. Notionally, the total configuration data for an access control device is able to be broken down into individual aspects. For example, in some embodiments the aspects include, but are not limited to, the following:

Access configuration data. For example, in some embodiments this aspect of configuration data includes data indicative of access permissions for various users/cards, and so on.

Hardware configuration data, such as firmware and/or other hardware drivers.

Scheduling data. In some embodiments an access control device is scheduled such that it behaves differently at different times. For example, in one scenario the level of access permission required on a weekday is different to that required on a weekend or public holiday. In some cases, access control devices are scheduled on a seven-day cycle, and scheduling data concerning public holidays or other unusual days needs to be provided on a periodic basis.

Although server 110 is schematically illustrated as a single component, in some cases it is defined by a plurality of distributed networked components.

For the sake of the present disclosure, it is assumed that each of access control devices 102 to 107 include similar hardware and software components, and that each device is configured to progress between a connected state and a disconnected state depending on whether or not a connection to network 108 and central administration server 110 is available. However, in other embodiments a variety of different access control devices are used. For example, in some embodiments the access control devices are designed, from a hardware perspective, to allow/deny control to a variety of different locations or functionalities.

In the context of the present disclosure, the term "access control device" refers generally to any device having an "access control" functionality. That is, any device with which a user interacts to gain access to a physical region or virtual functionality. Common examples include devices that control locking mechanisms on doors or other barriers. However, access control devices are also used for purposes such as activating lighting in a room. An access control device includes hardware and software components.

Figure 2:
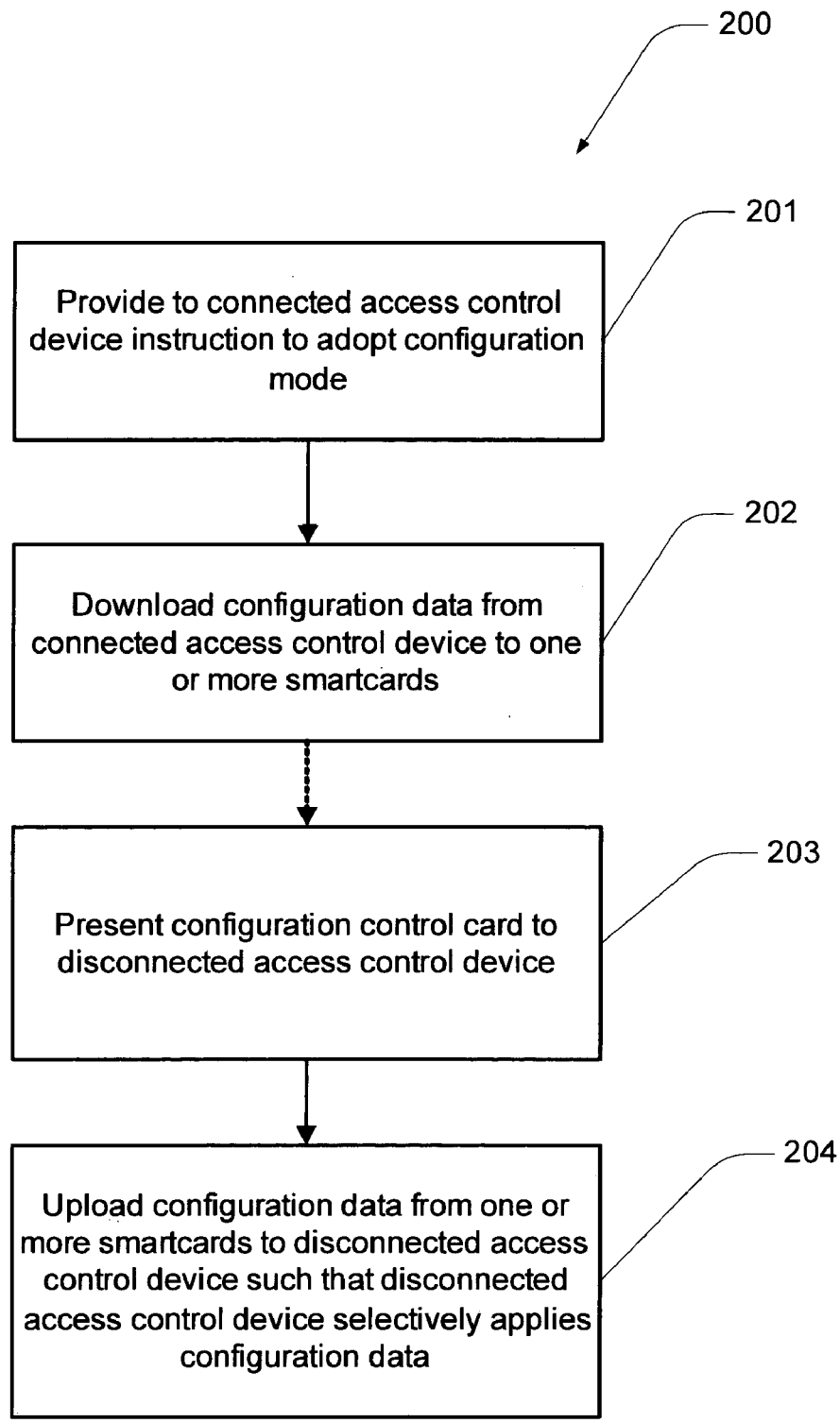
FIG. 2 schematically illustrates a method according to one embodiment.

Administration server 110 is used to deliver configuration data for access control devices 102 to 107, however, it will be appreciated that the server is only able to deliver such information to connected access control devices 102 to 104 via network 108. As such, other methods are required to allow the provision of configuration data to disconnected access control devices 105 to 107, and some embodiments of the present invention provide such methods. For example, FIG. 2 illustrates a method 200 for providing one or more aspects of configuration data to a disconnected access control device, as discussed below.

Step 201 includes providing an instruction to adopt a configuration mode. In the present example, prior to step 201, access control device 102 adopts a "normal" mode of operation, whereby it is generally responsive to the presentation of access cards for selectively either allowing or denying access to a location or functionality. In response to the provision of the instruction to adopt the configuration mode, access control device 102 progresses from the normal mode to the configuration mode.

In many of the embodiments considered herein, the instruction to adopt the configuration mode is provided by the presentation to the connected access control device (device 102 for the sake of the present example) of a "special" access card, in the form of a configuration control card. However, this should not be regarded as limiting, and in other embodiments the instruction is provided by alternate means. For example, rather than providing a configuration control card, a password or other form of authorization/authentication is provided to the access control device. Additionally, in further embodiments, an option exists to progress an access control device from the normal mode to the configuration mode by way of an instruction provided via the administration server. For example, the administration server is used to identify a controller from which configuration information will be written to one or more smartcards. Additionally, in further embodiments an alternate mode of interaction with access control device 102 allows that device to be progressed to the configuration mode.

The configuration control card need not be different from any other access card in a physical sense. In some embodiments the configuration control card additionally performs conventional access control functionalities.

Step 202 includes downloading configuration data collectively to one or more carrier substrates. In particular, this configuration data is obtained from database 215, and includes one or more aspects of configuration data relating to a particular disconnected access control device 205.

In the presently considered embodiments, the carrier substrates take the form of smartcards. The term carrier substrate should be read broadly to include any media capable of carrying digital information that is able to be read, modified or deleted. The term smartcard is used to describe a carrier substrate in card form. Smartcards carry digital information in a variety of ways, including by way of flash memory, magnetic strips, RFID chips, and the like.

The one or more aspects of configuration data are downloaded to the one or more smartcards "collectively" in the sense that, where the amount of data exceeds the storage capacity of a single smartcard, multiple smartcards are used. Where multiple smartcards are used, the data is distributed across those smartcards such that the data is written to the multiple smartcards collectively. In some cases only a single smartcard is used.

Figure 2A:
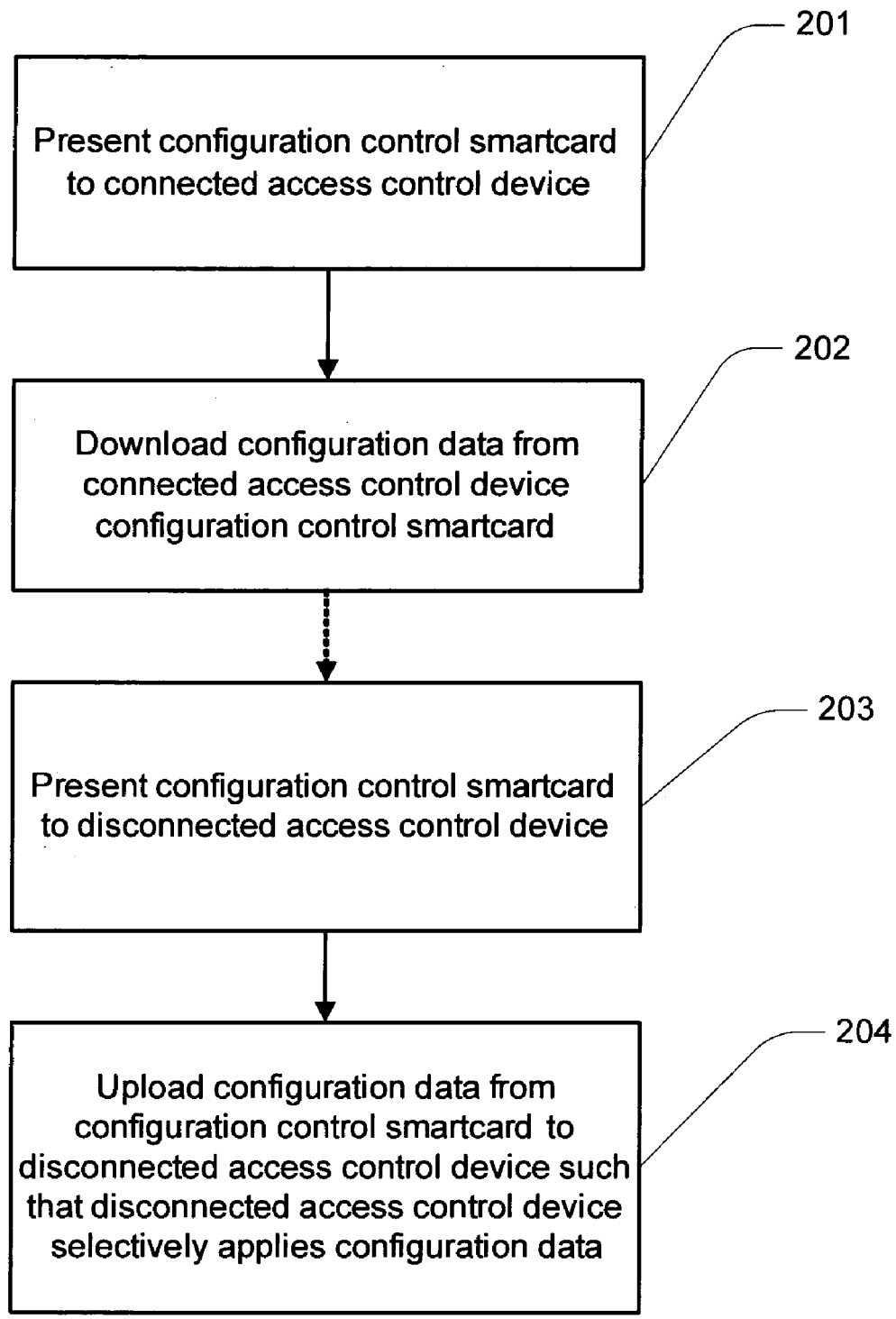
FIG. 2A schematically illustrates a method according to one embodiment.

In some embodiments, the configuration control card is a smartcard (that is, it is a configuration control smartcard), and in some such embodiments it defines one of the smartcards to which configuration data is written. Indeed, in some instances it defines the single smartcard to which configuration data is written, such as in the example of FIG. 2A.

In some embodiments one or more of the smartcards are defined by access cards that are otherwise used for access control purposes.

Step 203 includes presenting a configuration control card (which is typically the same card presented at step 201) to a disconnected access control device. The intention is to configure that disconnected access control device using the configuration data downloaded at step 202. In the present example, this concerns disconnected access control device 105. In response to the presentation of the configuration control card, access control device 105 progresses from the normal mode to the configuration mode. In some embodiments disconnected access control devices adopt a different configuration mode as compared with connected access control devices.

Step 204 includes uploading the configuration data from the one or more smartcards collectively to access control device 105. Access control device 105 then selectively applies none or more aspects of the configuration data uploaded.

Method 200 will be more fully understood on the basis of disclosure below, which describes methods performed by connected and disconnected access control devices.

Figure 3:
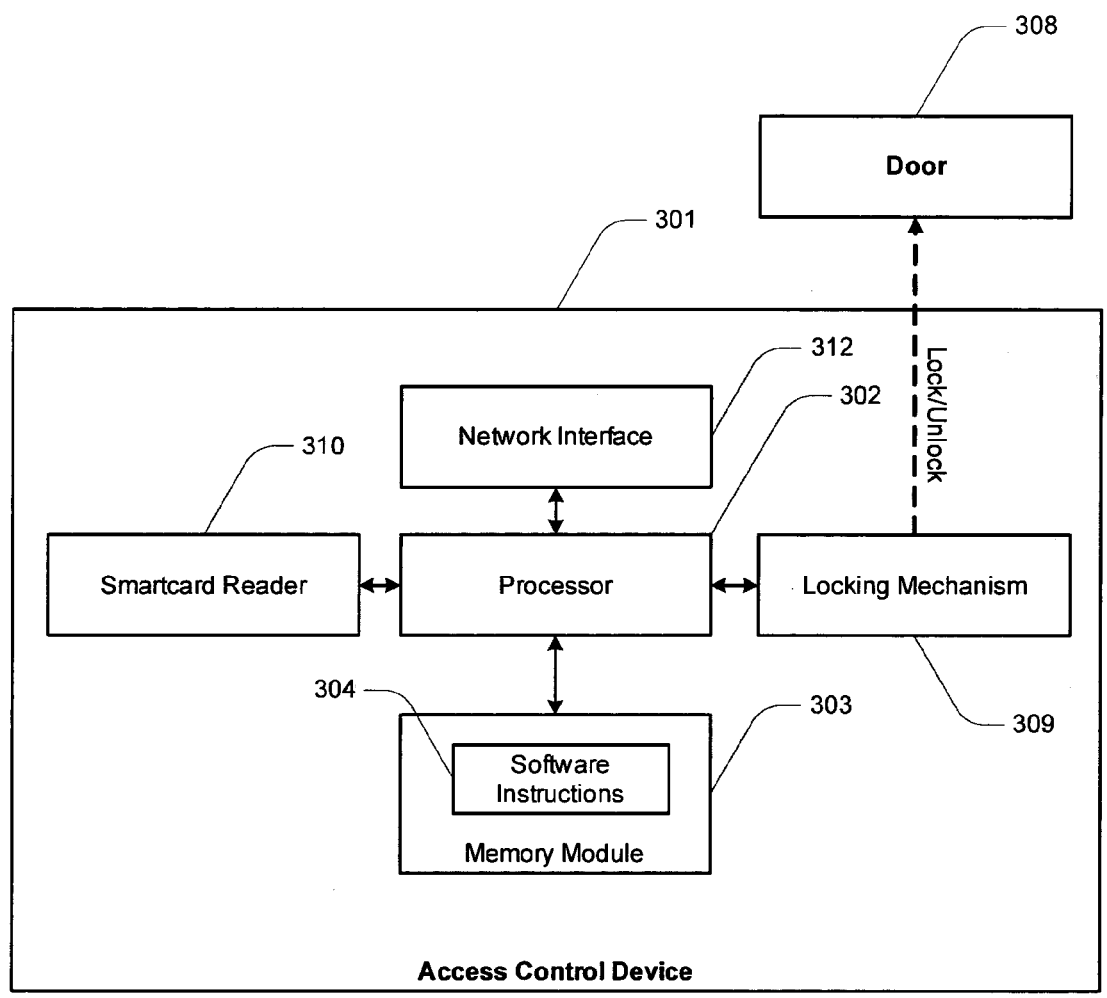
FIG. 3 schematically illustrates an access control device according to one embodiment.

FIG. 3 schematically illustrates an access control device according to one embodiment, in the form of access control device 301. Access control device 301 is configured to operate as a connected access control device or a disconnected access control device, depending on whether a connection to a central administration server is available. Device 301 is additionally configurable for integration into an access control environment such as environment 101 of FIG. 1.

Access control device 301 includes a processor 302 coupled to a memory module 303. Memory module 303 carries software instructions 304 which, when executed on processor 302, allow access control device 301 to perform various methods and functionalities described herein.

In the present example, access control device 301 is configured for selectively granting access through a door 308. In particular, processor 301 is coupled to a locking mechanism 309 which, when in a locked state, prevents access through door 308, and when in an unlocked state, permits access through door 308. The locked state is default. A user wishing to gain access through door 308 presents an access card to a card reader 310, which is also coupled to processor 301. Upon presentation of an access card, processor 301 performs an authorization/authentication process to determine whether or not access should be granted. In the event that the authorization/authentication process is successful, mechanism 309 is progressed to the unlocked state for a predefined period of time, typically the order of a few seconds, before returning to the locked state. If the process is unsuccessful, mechanism 309 remains in the locked state, and access is denied.

Figure 3A:
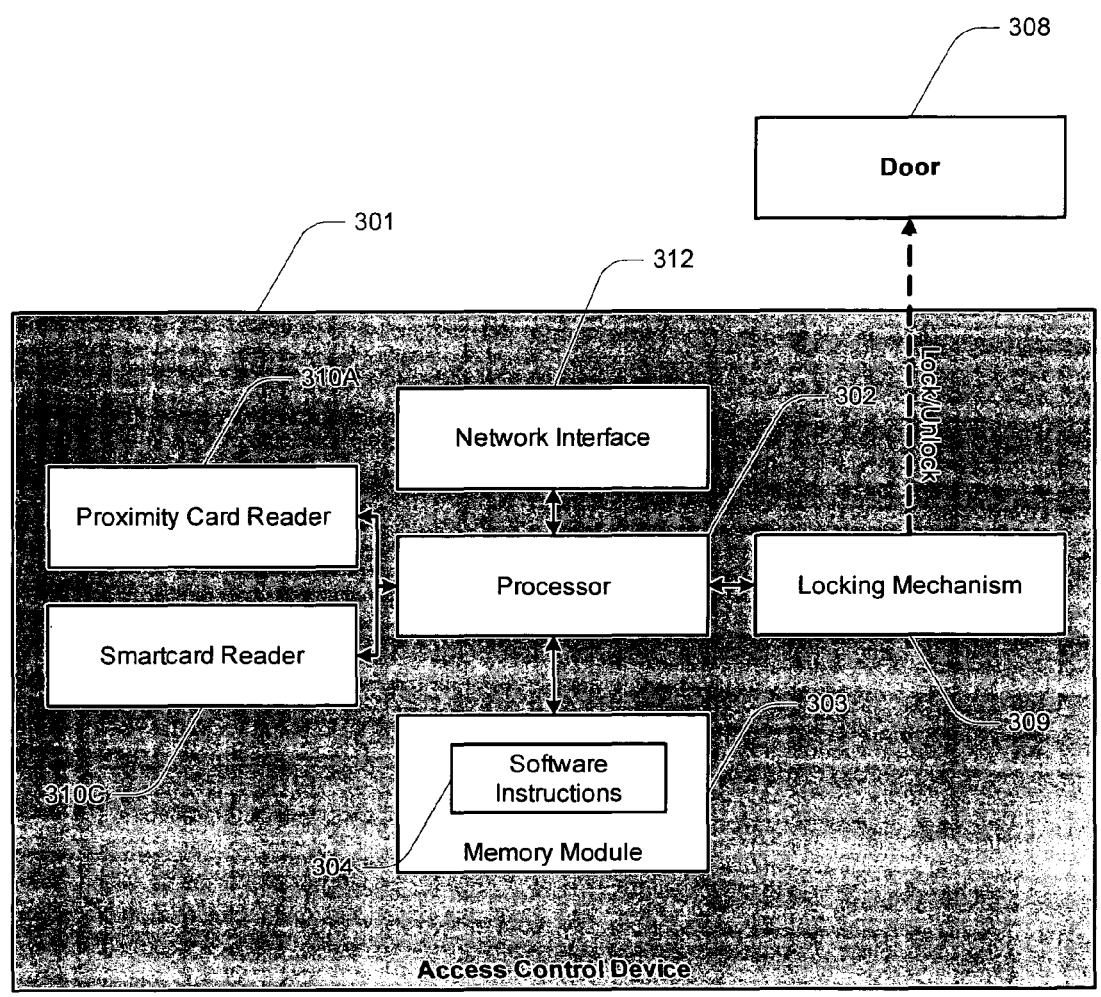
FIG. 3A schematically illustrates an access control device according to one embodiment.

The nature of card reader present varies between embodiments depending on the nature of access card that is used in a given access control environment. In the embodiment of FIG. 3, access cards are in the form of smartcards, and reader 310 is a smartcard reader. That is, a configuration control smartcard is readable in substantially the same manner as an access card configured for use with the access control device. However, in the alternate embodiment of FIG. 3A, access card are in the form of proximity cards, and a proximity card reader 310A is provided. In that case, a smartcard reader 310C is also provided for allowing smartcard reading/writing functionalities described herein. In further embodiments access codes are used rather than access cards, in which case the reader includes an interface for entering an access code. In some embodiments a combination of these approaches are used.

In the present embodiment, device 301 includes a network interface 312 (such as a Ethernet or other wired/wireless network interface) coupled to processor 302 for allowing access control device 301 to communicate over a network (such as network 108 of FIG. 1). In the present embodiment access control device 301 is configured for operation in either a connected state (with connection to the network and administration server) or a disconnected state (without connection to the network and server).

Figure 4:
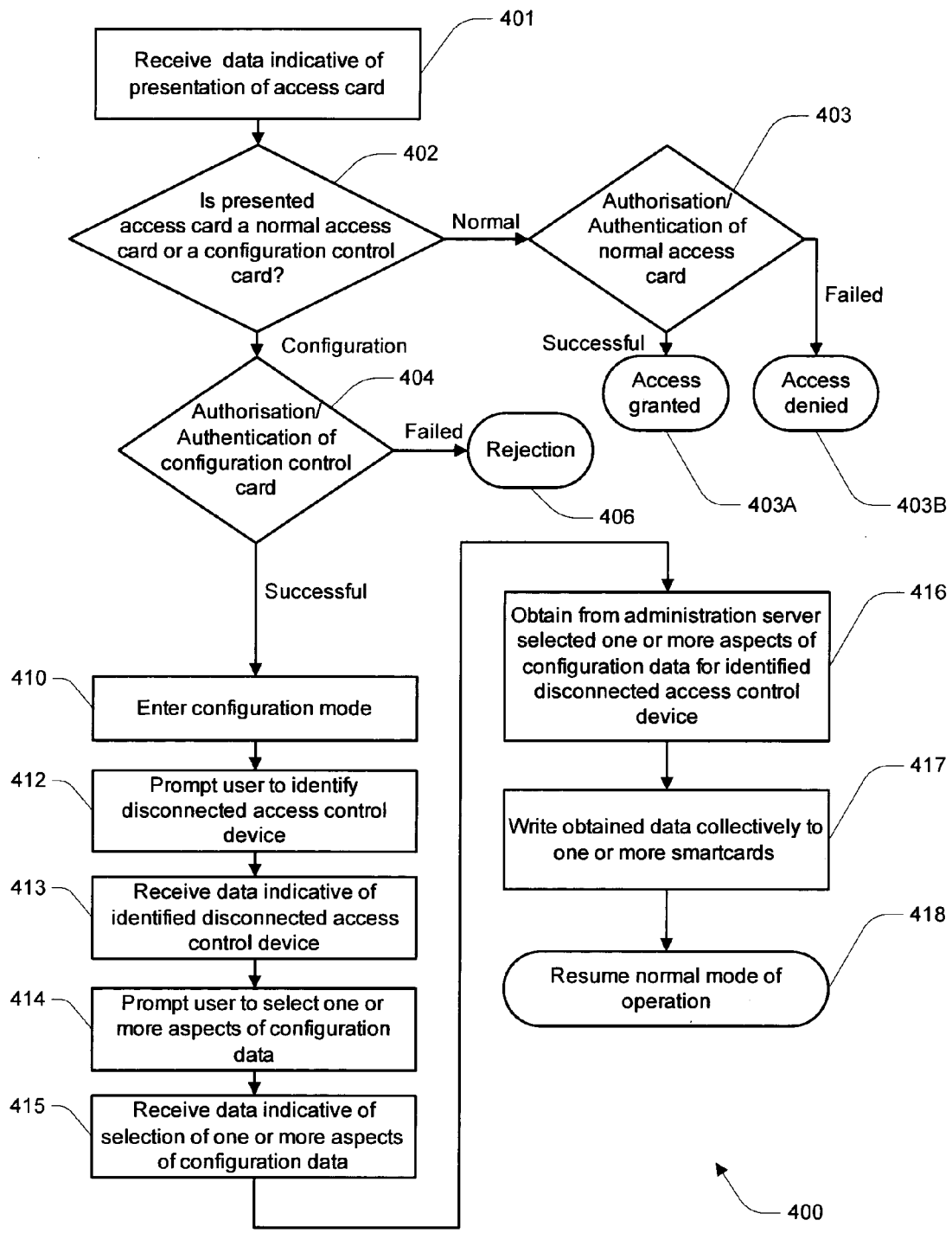
FIG. 4 schematically illustrates a method according to one embodiment.

FIG. 4 illustrates a method 400 according to one embodiment. Method 400 is performable by an access control device, such as access control device 301, when that device is connected to a network and central administration server.

Method 400 commences with the access control device in the normal mode. Step 401 includes receiving data indicative of the presentation of a card, such as an access card. In some embodiments step 401 alternately includes receiving data indicative of an alternate identifier, such as a password. At decision 402 it is determined whether this card is a normal access card (used for access control purposes), or a configuration control card (used to access the configuration mode). In the event that the presented card is a normal access card, the method progresses to an access control authorization/authentication procedure at step 403, and access is either granted or denied at steps 403A and 403B respectively. In the event that the presented card is a configuration control card, the method progresses to a configuration mode authorization/authentication procedure at step 404. In the case that the result of the authorization/authentication procedure is successful, the method progresses to step 410. Otherwise, the method progresses to step 406, where the method terminates in a rejection, and the user is not permitted to progress the device to the configuration mode.

As context, authentication is a process by which a user verifies his/her identity, for example by presenting an access card (such as a smartcard), optionally in combination with other information (such as biometric information). Authorization is a process whereby access rights corresponding to the authenticated user are queried, for example to determine a level of security clearance.

Disclosure herein of access cards should not be read as limiting. In other embodiments, users interact with access control devices by other techniques, such as by way of biometric information, entry-codes entered by way of a keypad, spoken passwords, and so on. These various approaches are used in alternate embodiments. For example, in one embodiment a user enters a configuration entry code as an alternative to presenting a configuration control card.

In some embodiments, the configuration control card is used both for access control purposes and to access the configuration mode, and the user is permitted to select which of these is desired upon presentation of the card.

Step 410 adopting the configuration mode. Upon adopting the configuration mode, the access control device provides the user with an interface for prompting the user to select between options or perform various tasks, and for allowing the user to select between presented options and/or provide information. In some cases this interface is provided by a screen and keypad, or alternately a touch-screen.

Step 412 includes prompting the user to identify a disconnected access control device for which configuration data is sought. In the present embodiment, the disconnected access control device is identified by way of a unique identifier assigned to that access control device during an earlier commissioning process. Data indicative of this unique identifier is received at step 413.

Step 414 includes prompting the user to select one or more sought after aspects of configuration data. Data indicative of this selection is received at step 415.

Step 416 includes obtaining data indicative of the selected one or more aspects of configuration data for the identified disconnected access control device from a central source, such as server 110/database 115 in the context of FIG. 1. This data, or a modified version thereof, is then written to one or more smartcards collectively at step 417. In particular, data indicative of the one or more aspects of configuration data is written to one or more smartcards collectively, in a format such that a disconnected access control device is configured for reading the one or more smartcards and selectively applying the one or more aspects of configuration data. This is discussed in more detail further below.

Step 418 includes resuming the normal mode of operation. In some embodiments, this occurs in response to the user presenting the configuration control card once again to confirm that he/she is finished with the configuration mode. However, in at least some embodiments where an alternate approach is implemented to provide an instruction to adopt the configuration mode (such as a the provision of a password), that approach is repeated to effect step 418.

Figure 4A:
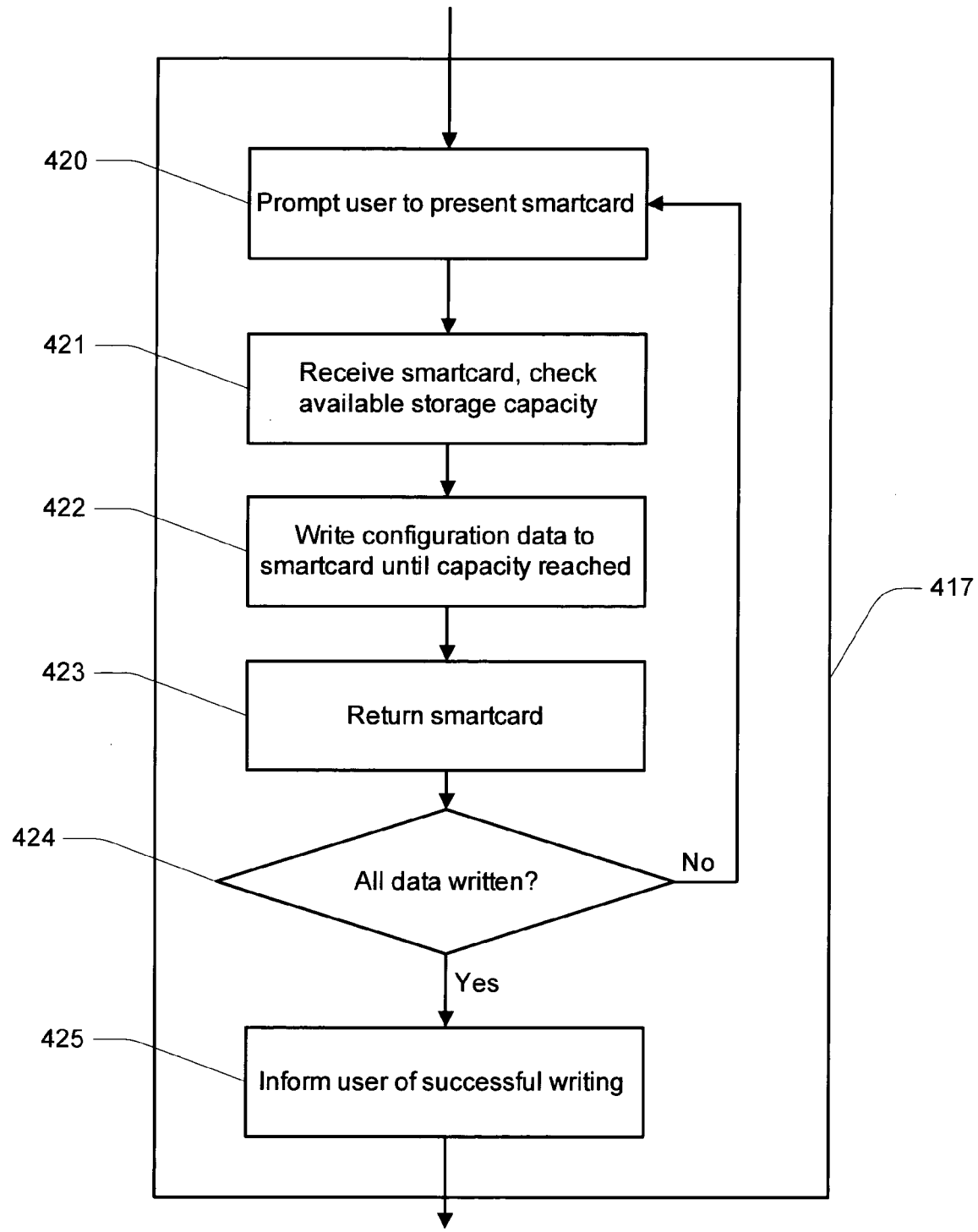
FIG. 4A schematically illustrates a method according to one embodiment.

FIG. 4A illustrates step 417 in more detail. As foreshadowed, data is written to one or more smartcards collectively. At step 420, the user is prompted to present a first smartcard. In some embodiments this first smartcard is the configuration control card, in which case the method progresses. A smartcard is received at step 421, and a storage capacity check is performed. At step 422, some or all of the relevant configuration data is written to the presented smartcard. The smartcard is returned to the user at step 423. At step 424 it is decided whether any further data is to be written. For example, in the event that the total amount of data to be written exceeds the available storage capacity of the presented smartcard, only partial data is written to the presented smartcard. If all relevant configuration data has been written, the user is informed of a successful writing of data at step 425. Otherwise the method loops to step 420. It will be appreciated that the method continues until all of the relevant data has been written collectively across a plurality of smartcards.

In some embodiments data indicative of the number of smartcards used is written to one of the smartcards. This later assists a disconnected reader in determining whether all relevant data has been read, regardless of whether the smartcards are presented in the same order to which they were written. In one embodiment this data is written to the final smartcard used. In another embodiment, a serial number is written to each card. For example, a serial numbers might be indicative "card 1, non-final", "card 2, non-final" and "card 3, final" for a three card series.

Figure 5:
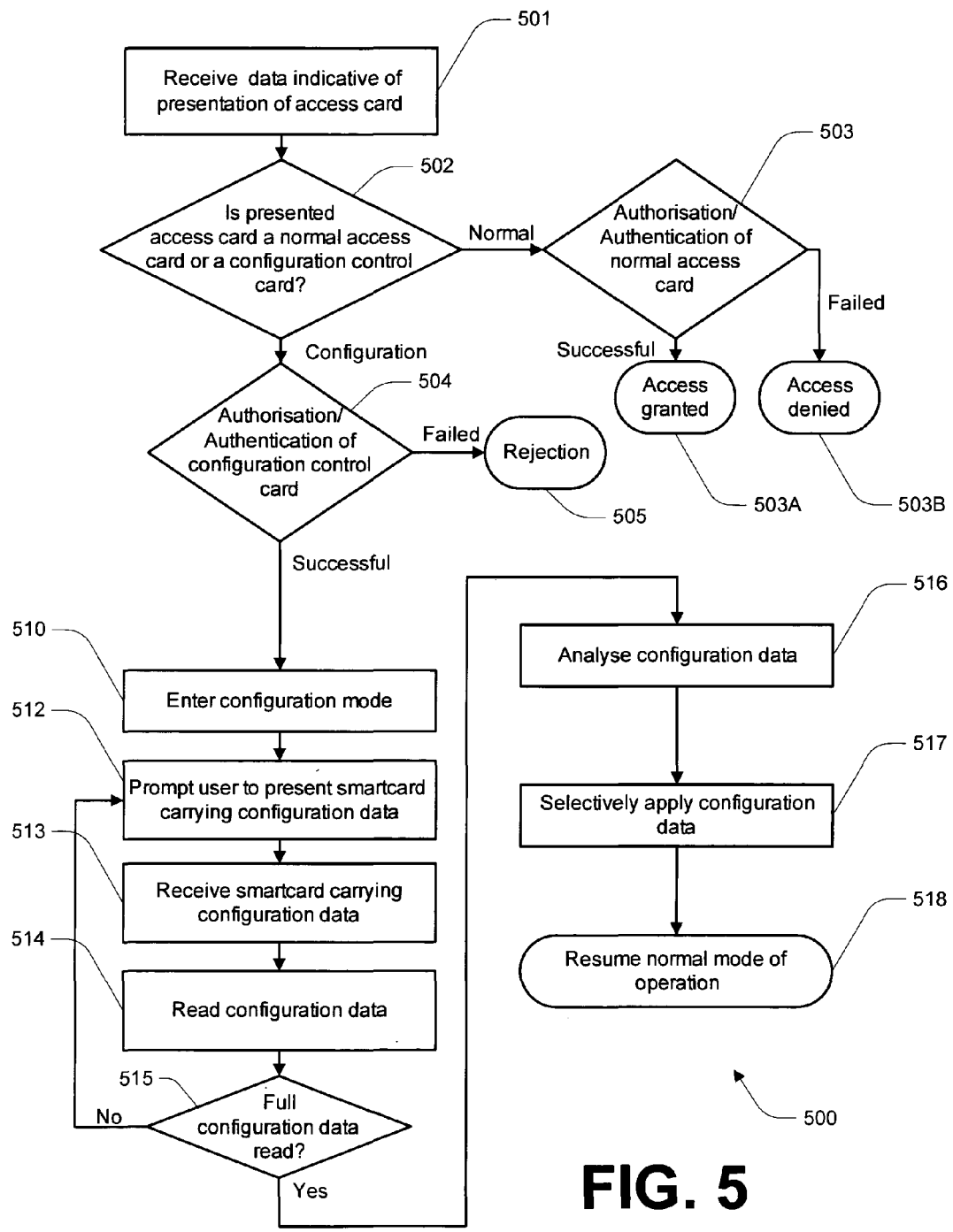
FIG. 5 schematically illustrates a method according to one embodiment.

FIG. 5 illustrates a method 500 according to one embodiment. Method 500 is performable by an access control device, such as access control device 301, when in the disconnected state.

Method 500 commences with the access control device in the normal mode. Step 501 includes receiving data indicative of the presentation of an access card. At decision 502 it is determined whether this card is a normal access card (used for access control purposes), or a configuration control card (used to access the configuration mode). In the event that the presented card is a normal access card, the method progresses to an access control authorization/authentication procedure at step 503, and access is either granted or denied at steps 503A and 503B respectively. In the event that the presented card is a configuration control card, the method progresses to a configuration mode authorization/authentication procedure at step 504. In the case that the result of the authorization/authentication procedure is successful, the method progresses to step 510. Otherwise, the method progresses to step 506, where the method terminates with a rejection, and the user is prevented from accessing the configuration mode.

Step 510 includes adopting the configuration mode. Upon adopting the configuration mode, the access control device provides the user with an interface for prompting the user to select between options or perform various tasks, and for allowing the user to select between presented options and/or provide information. These options and tasks in some cases differ from those provided at step 410, given that the present access control device is operating in the disconnected state.

Step 512 includes prompting the user to present a smartcard carrying some or all of the data indicative of one or more aspects of configuration data that is to be uploaded. In some embodiments where the configuration control card carries a portion of the relevant data, step 512 is omitted on a first pass, and the method progresses immediately to step 514.

In some embodiments an access control device is configured to read multiple smartcards simultaneously. In some such cases, step 512 includes prompting the user to present a single to multiple smartcards.

A smartcard carrying at least a portion of configuration data is received at step 513, and the configuration data is read by the access control device at step 514. At decision 515 it is determined whether or not complete data has been read. It will be appreciated that where multiple smartcards are used, each of these needs to be read before the complete data has been read. If there is more data to be read, the method loops to step 512. Otherwise, once all of the configuration data has been read, the method progresses to step 516.

In some embodiments the access control device erases the configuration data from a smartcard as it is read. Additionally, in some embodiments there is no restriction on the order in which smartcards are presented in instances of step 512. That is, smartcards need not be presented to the disconnected controller in the same order as they were earlier presented to the connected controller.

Step 516 includes analyzing the read configuration data to determine which of the included aspects of configuration data should be applied, if any. An aspect of configuration data is "applied" in the sense that it replaces corresponding data that is already maintained by the relevant access control device. In determining whether or not a given aspect of configuration data is to be applied, the following criteria are particularly considered:

Whether a corresponding aspect of configuration data maintained by the access control device is newer than the read aspect of configuration data. It will be appreciated that this avoids the application of outdated data.

Whether the read aspect of configuration data is compatible with the access control device. It will be appreciated that this reduces the risk of an access control device malfunctioning due to the application of incompatible configuration data.

One or more of the aspects of the read configuration data are then applied at step 517. At step 518 the access control device resumes the normal mode of operation. In some embodiments, this occurs in response to the user presenting the configuration control card once again to confirm that he/she is finished with the configuration mode.

In some embodiments, a report indicative of which (if any) aspects of configuration data are applied at step 517 is written to a smartcard (such as the configuration card or an access control smartcard subsequently presented to the disconnected access control device in the normal course of operation), and this report is propagated back to the central server when that smartcard is next presented to a connected access control device. This assists the access control device in maintaining details not only of up-to-date configuration data for each access control device, but also details of the configuration data applied by each access control device.

In some embodiments, if the central server is aware that a particular disconnected access control device is already applying up-to-date configuration data, the server prevents the writing of configuration data for that disconnected access control device to smartcards via connected readers operating in the configuration mode.

It will be appreciated that the present disclosure provides for various systems and methods for configuring access control devices, particularly disconnected access control devices, which are advantageous in light of what is known in the art. In particular, the use of smartcards for delivering configuration data to disconnected readers presents a time and cost effective approach, and this is further improved by the ability to obtain the relevant configuration data from any connected access control device.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions, e.g., a computer program that are for execution on one or more processors, e.g., one or more processors that are part an information system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for configuring access control devices via a central server that maintains configuration data, a first plurality of connected access control devices, and a second plurality of disconnected access control devices, wherein the disconnected access control devices are access control devices with no connection to the central server, the method comprising configuring a given one of the first plurality of connected access control devices to perform the following steps:
   (a) receiving, whilst in a first mode of operation wherein the given one of the connected access control devices is configured to perform an access control functionality, data indicative of an instruction to adopt a second mode of operation;
   (b) being responsive to the data received at (a) for adopting the second mode of operation;
   (c) receiving data indicative of a user selection of a specified one of the disconnected access control devices, selected from a set of disconnected access control devices in respect of which the central server maintains configuration data;

(d) obtaining, from the central server, first data indicative of one or more aspects of configuration data for the specified disconnected access control device and, on the basis of that first data, defining second data indicative of the one or more aspects of configuration data for the specified disconnected access control device; and (e) writing to one or more carrier substrates collectively the second data indicative of the one or more aspects of configuration data for the specified disconnected access control device, wherein the specified disconnected access control device is configured for reading the one or more carrier substrates and selectively applying the one or more aspects of configuration data.

2. The method according to claim 1 wherein the one or more carrier substrates include one or more smartcards.

3. The method according to claim 2 wherein the data indicative of an instruction to adopt a second mode of operation is provided by one of the smartcards.

4. The method according to claim 1 wherein, in the first mode of operation, the given one of the connected access control devices performs an access control functionality and, in the second mode of operation, the given one of the connected access control devices performs a configuration download functionality.

5. The method according to claim 1 including the steps of:

(f) providing an interface for allowing user selection of the one or more aspects of configuration data from a list of available aspects of configuration data; and (g) receiving data indicative of user-selection of the one or more aspects of configuration data.

6. The method according to claim 1 wherein the first data indicative of the one or more aspects of configuration data is substantially identical to the second data indicative of the one or more aspects of configuration data.

7. The method according to claim 1 including the step of writing to at least one of the carrier substrates data indicative of how many carrier substrates are written to at step (e), and wherein a plurality of carrier substrates are written to at step (e).

8. The method according to claim 1 including the step of determining how many carrier substrates to which the second data indicative of the one or more aspects of configuration data is to be collectively written.

9. The method according to claim 1 wherein the one or more aspects of configuration data include any one or more of the following:
access configuration data;
hardware configuration data; and
scheduling data.

10. An access control device configured to operate in an access control environment, the access control environment including a central server that maintains configuration data, a first plurality of connected access control devices, and a second plurality of disconnected access control devices, wherein the disconnected access control devices are access control devices with no connection to the central server, the access control device having hardware that is configured to:

(a) receive, whilst in a first mode of operation wherein the access control device is configured to perform an access control functionality, data indicative of an instruction to adopt a second mode of operation;

(b) in response to the data received at (a), adopting the second mode of operation;

(c) obtaining, from the central server, first data indicative of one or more aspects of configuration data for one or more of the disconnected access control devices and, on the basis of that first data, defining second data indicative of the one or more aspects of configuration data for the one or more of the disconnected access control devices;

(d) writing to one or more carrier substrates collectively the second data indicative of the one or more aspects of configuration data for the one or more of the disconnected access control devices, wherein the one or more of the disconnected access control devices is/are configured for reading the one or more carrier substrates and selectively applying the one or more aspects of configuration data; and (e) after writing to one or more carrier substrates, resuming the first mode of operation where the access control devices returns to performing access control functionality.

11. The access control device of claim 10 wherein the data indicative of an instruction to adopt the second mode of operation is provided by one of the smartcards.

12. The access control device of claim 10 wherein, in the first mode of operation, the access control device is configured to perform an access control functionality and, in the second mode of operation, the access control device is configured to perform a configuration upload functionality.

13. The access control device of claim 10 wherein the one or more aspects of configuration data include any one or more of the following:
access configuration data;
hardware configuration data; and
scheduling data.

14. The access control device of claim 10 wherein the one or more carrier substrates include one or more smartcards.

15. An access control device configured to operate in an access control environment including a plurality of connected access control devices, being access control devices configured to communicate with a central server that maintains configuration data, and a plurality of disconnected access control devices, being access control devices with no connection to the central server, the access control device comprising:

a processor for receiving, whilst in a first mode of operation wherein the access control device is configured to perform an access control functionality, data indicative of an instruction to adopt a second mode of operation, and in response, adopting the second mode of operation, and once in the second mode of operation, obtain, from the central server, a set of configuration data for one of the disconnected access control devices; and a substrate writer for writing to a carrier substrate the set of configuration data in a format that the disconnected access control device can read from the carrier substrate, and then apply during subsequent operation of the disconnected access control device in the access control environment.

16. The access control device of claim 15, wherein after the substrate writer writes to the carrier substrate, the processor resuming the first mode of operation where the access control device returns to performing access control functionality.

17. The method of claim 1, further comprising the step of:

(f) after writing to one or more carrier substrates, resuming the first mode of operation where the given one of the connected access control devices returns to performing access control functionality.

* * * * *